(12) United States Patent
Luthardt

(10) Patent No.: US 9,459,441 B2
(45) Date of Patent: Oct. 4, 2016

(54) LONG-RANGE OPTICAL APPARATUS INCLUDING BINOCULARS

(71) Applicant: Carl Zeiss Sports Optics GmbH, Wetzlar (DE)

(72) Inventor: Dirk Luthardt, Heuchelheim (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 14/461,274

(22) Filed: Aug. 15, 2014

(65) Prior Publication Data
US 2015/0049382 A1    Feb. 19, 2015

(30) Foreign Application Priority Data

Aug. 15, 2013  (DE) .................. 10 2013 013 480 U

(51) Int. Cl.
*G02B 23/18*   (2006.01)
*G02B 7/12*    (2006.01)

(52) U.S. Cl.
CPC ............... *G02B 23/18* (2013.01); *G02B 7/12* (2013.01)

(58) Field of Classification Search
CPC .............................. G02B 23/18; G02B 7/12
USPC ........................................ 359/408, 412, 413
See application file for complete search history.

(56) References Cited

U.S. PATENT DOCUMENTS

| | | | |
|---|---|---|---|
| 4,080,042 A * | 3/1978 | Hornschu et al. | 359/416 |
| 4,186,992 A * | 2/1980 | Kamakura | 359/416 |
| 4,325,602 A * | 4/1982 | Lange | 359/408 |
| 4,346,960 A * | 8/1982 | Lehrmund et al. | 359/414 |
| 4,913,541 A * | 4/1990 | Wakayama et al. | 359/408 |
| 5,103,248 A | 4/1992 | Sato | |
| 8,441,621 B2 * | 5/2013 | Pernstich | B25G 1/00 356/4.01 |
| 2005/0128576 A1 * | 6/2005 | Perger et al. | 359/412 |

FOREIGN PATENT DOCUMENTS

| | | | | |
|---|---|---|---|---|
| AT | 349785 B | | 4/1979 | |
| CH | 617514 AS | * | 5/1980 | ............. G02B 23/18 |
| DE | 2 316 955 A1 | | 10/1974 | |
| DE | 2 326 088 A1 | | 11/1974 | |
| DE | 25 33 362 A1 | | 2/1976 | |
| DE | 32 20 764 A1 | | 4/1983 | |
| DE | 298 10 161 U1 | | 10/1998 | |
| DE | 10 2012 009 990 A1 | | 11/2013 | |
| GB | 1427004 A | | 3/1976 | |
| WO | 2014/108429 A1 | | 7/2014 | |

OTHER PUBLICATIONS

Partial English translation and the search report of the European Patent Office dated Dec. 23, 2014 in corresponding European patent application EP14002833.3.
Partial English translation and the Office action of the German Patent Office dated Mar. 20, 2014 in German patent application 10 2013 013 480.3 on which the claim of priority is based.

\* cited by examiner

*Primary Examiner* — Frank Font
(74) *Attorney, Agent, or Firm* — Walter Ottesen, P.A.

(57) ABSTRACT

A long-range optical apparatus, particularly a binocular having two tubes for accommodating long-range optical devices, includes a first folding bridge, a second folding bridge, and preferably a third folding bridge. The folding bridges are pivotably arranged between the tubes of the long-range optical device and each include a first and a second bridge element associated with each other and pivotable relative to each other. At least one folding bridge has a fit that prevents mechanical contact of the bridge elements to each other at least in regions of the pivoting range of the bridge elements.

20 Claims, 7 Drawing Sheets

LONG-RANGE OPTICAL APPARATUS INCLUDING BINOCULARS

CROSS REFERENCE TO RELATED APPLICATION

This application claims priority of German patent application no. 10 2013 013 480.3, filed Aug. 15, 2013, the entire content of which is incorporated herein by reference.

FIELD OF THE INVENTION

The invention relates to a long-range optical apparatus, in particular a binocular (often referred to in plural as binoculars). The binocular has two tubes for accommodating long-range optical devices and folding bridges pivotably arranged between the tubes of the long-range optical device, each of the folding bridges including at least a first and a second bridge element associated to each other and pivotable relative to each other.

BACKGROUND OF THE INVENTION

A binocular telescope usually is a long-range optical device which is used to observe objects with a certain magnification. With binocular telescopes, the observed objects can be seen with both eyes through separate optical paths that are provided in respective separate housing parts, the tubes. For this purpose, the two optical paths shall be aligned exactly in parallel to each other, preferably with an angular deviation of not more than 10' for any eye spacing.

For adjusting a binocular to the eye spacing of a respective individual user, generally the two tubes which are connected to one another via folding bridges are folded through a common mechanical axis that forms a hinge axis. This allows a user to individually adapt the binocular telescope to his eye spacing which is also known as interpupillary distance IPD, for this see, for example, FIG. 2 of the accompanying drawings.

The folding bridges of a binocular generally function like a hinge. In case of a single folding bridge, the hinge or pivoting axis of the binoculars (folding axis) is already unambiguously defined by the hinge axis of the single folding bridge. In case of two folding bridges, the folding axis results from the common averaged axis of the two hinge axes of the two folding bridges. This means that the hinge axes of the two folding bridges have to be aligned very precisely to ensure a proper folding movement without unwanted friction or deformation forces. Otherwise, jamming may occur upon folding. In case of more than two folding bridges, this problem is still aggravated considerably.

In order to have the three hinge axes aligned, in case of three bridge elements, to form a common folding axis which ensures that the binocular alignment of the two optical paths as set is maintained upon folding, very high accuracy requirements are imposed on the manufacturing of the bridge elements. This results in high costs in the manufacturing of such binoculars having more than two folding bridges. The required eye-side 10' of axial binocular alignment must be implemented on all mechanical interfaces of the individual bridge elements. If the alignment is not within the required eye-side 10' parallelism, the binoculars will not be usable, or usability thereof may at least be strongly impaired.

This particularly applies when the binocular is exposed to mechanical and climatic stress which is typical for an outdoor device such as in the hunting sector. This means that the bridge elements must have a robust design so that the factory-set binocular alignment will not be impaired over the lifetime of the product, which requires high mechanical strengths in the configuration of the binocular telescope.

A single folding bridge might be unsuited for this purpose due to insufficient stability, and consequently generally at least two folding bridges are implemented in practice.

The further the two folding bridges are spaced axially from each other, the more stable the folding axis of the binoculars will be, and the more robust the product will be in terms of meeting the required binocular alignment.

In case of a third folding bridge in the middle, the additional hinge axis thereof at the folding axis will also have an impact on stability. The folding axis of the binoculars will therefore be overdetermined (three hinge axes), which imposes even significantly higher accuracy requirements on manufacturing than with only two hinge axes.

DE 2 316 955 describes a binocular telescope with adjustable use condition and packed condition and with common focusing of the two individual telescopes, in which two articulated bridges are arranged between the individual telescopes. Between the articulated bridges or within one of the articulated bridges, an axially movable member is disposed via which the binocular telescope can be focused.

SUMMARY OF THE INVENTION

It is an object of the invention to mitigate these high requirements on manufacturing tolerances for a binocular having more than two folding bridges.

In addition, it would be advantageous to further promote stability and increase robustness of the binoculars by at least one further, third folding bridge.

This object is achieved by a long-range optical device or apparatus, in particular a binocular, having two tubes for accommodating long-range optical devices, a first folding bridge, a second folding bridge, and preferably a third folding bridge which are pivotably arranged between the tubes of the long-range optical device, each of the folding bridges including at least a first and a second bridge element associated to each other and pivotable relative to each other, wherein at least one folding bridge has a fit that prevents mechanical contact of the bridge elements to each other at least in sections of the pivoting range of the bridge elements in the absence of an external force. Thereby, a gap is defined between the bridge elements of this at least one folding bridge, which allows for much easier manufacturing of this folding bridge since the tolerances necessary for this gap can be selected far less critically than it is necessary for the two other, first and second folding bridges of the binoculars. In this way, overdetermination of the folding or pivoting axis by the at least one additional folding bridge can be avoided.

When this fit defines a constant spacing of the bridge elements relative to each other, in particular also during a pivoting movement of the bridge elements, friction can thereby be avoided over the entire folding or pivoting range during folding or pivoting.

In the various embodiments of the invention, advantageously in terms of ease of manufacturing the spacing of the bridge elements is in a range from 0.001 mm to 1.5 mm, preferably in a range from 0.01 mm to 1.3 mm, and most preferably in a range from 0.1 mm to 1.1 mm.

When without a further mechanical load apart from the own weight of the long-range optical device, the fit defines a spacing between the bridge elements of the folding bridge which upon folding or pivoting of these bridge elements relative to each other substantially prevents frictional forces from being caused between these bridge elements and mechanical contact of the bridge elements may only occur under stronger forces, additional strength can be conferred to the binoculars.

This provides for a material-efficient configuration of the binoculars and hence for weight and cost reduction with substantially the same strength. However, shock and impact strength may even be increased, since under a mechanical load an at least partially elastic deformation may be caused initially, and in case of a mechanical contact of the bridge elements of the folding bridge forces will have a reduced effect.

By appropriately dimensioning the fit between the bridge elements, the extent of an allowable external force may be set, up to which the fit is capable to absorb elastic deformation and maximum allowable elastic deformation of the tubes relative to one another is possible, before mechanical contact between the bridge elements or engagement of the bridge elements to one another is caused.

In such embodiments it is further possible to use plastic or fiber composite materials for the tubes and for the bridge elements of the folding bridges of the binoculars, for example glass and carbon fiber composite materials.

Advantageously, a spacer may be arranged between the bridge elements of the folding bridge, which is reversibly deformable at least partially, and which is capable to absorb forces between the bridge elements of the folding bridge and to absorb more energy by virtue of its deformation, which will then no longer be able to damage the long-range optical device, in particular in case of an inadvertent external force.

In addition, this spacer may generate predefined frictional forces which counteract an inadvertent misadjustment of the folding bridge during use of the binoculars.

This spacer advantageously includes an elastomer, in particular a synthetic rubber or a porous structure.

When the bridge elements of the at least one folding bridge have a radial dimension varying over the pivoting range to define a clearance as a function of the pivoting position, it is possible in this embodiment, since the clearance is no longer constant over the entire pivoting range, to establish a particularly stable and very shock resistant condition of the long-range optical device, for example in a pivoting position corresponding to a transport position in which the bridge elements may engage each other and the binoculars can be transported particularly safely.

For this purpose, it is even possible for an elastomer arranged between the bridge elements to be pressed, preferably in a defined manner, so that a predefined mechanical bias results which counteracts external deformation forces and provides the user with a tactile feedback that the long-range optical device is in its transport position.

When the bridge elements of the at least one folding bridge have an interengaging structure that is radially varying in an axial direction, in case of axial loads this permits forces between the tubes that exceed a value definable by the dimensioning of the fit to be absorbed between the bridge elements of the at least one folding bridge, and this may contribute to an increase in axial stability of the binoculars.

When the at least one folding bridge includes the second folding bridge, which is arranged axially between the first and third folding bridges, high precision can be provided by the spaced first and third folding bridges, and the central folding bridge may contribute to enhanced stability.

In one embodiment, in which the at least one folding bridge includes the first and third folding bridges, with the first folding bridge arranged axially in front of the second folding bridge and the third folding bridge axially behind the second folding bridge, very advantageous manufacturing is possible since in this case only the central folding bridge must have a very accurately defined fit, while the two other folding bridges can still provide sufficient stability for many cases, at greatly reduced manufacturing costs.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
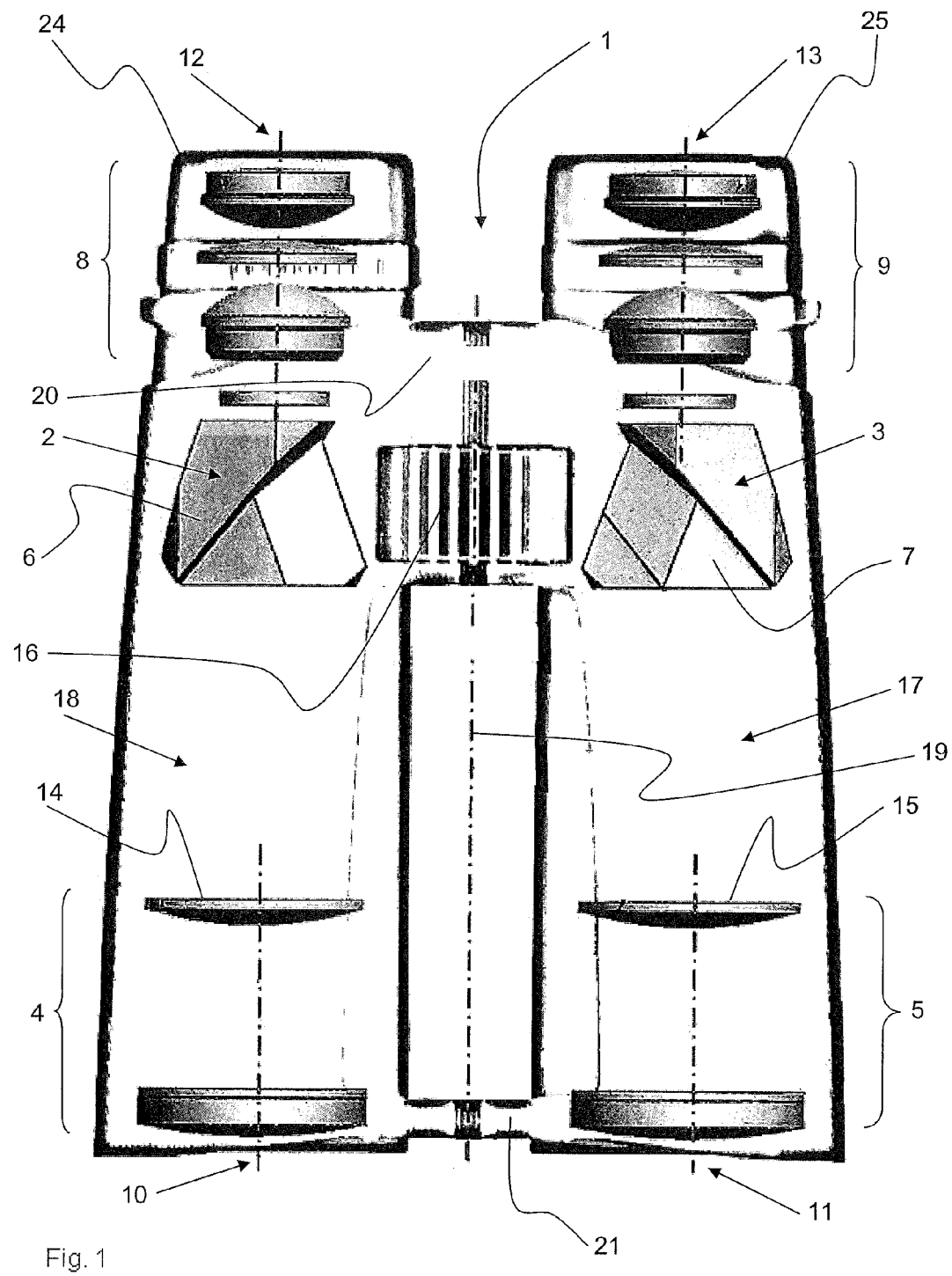
FIG. 1 is a partial cross-sectional view of a first embodiment of the invention, approximately through the plane of the optical axes of the binocular.

For the sake of simplicity and clarity, the following definitions are made as part of the description and disclosure of the invention.

DEFINITIONS

Unless otherwise specified, the term "axial" always refers to the pivoting axis of the folding bridges. Axially "in front of" refers to the direction as seen from the user, that is toward the observed object when using the long-range optical device. Therefore, a first element is arranged "axially behind" another, second element, if the first element is disposed further axially forward toward the observed object than the second element. Unless otherwise specified, the term "lateral" always refers to a direction perpendicular to the pivoting axis of the folding bridges.

The term "tube" describes a generally tubular configuration in which optical devices are accommodated, in particular optically imaging devices, and is not limited to cylinder-symmetrical configurations. For example, for reasons of ergonomics, it may be useful to design the outer surface of the tubes so that it is adapted to the handling of the user. Further, it may be advantageous to configure the interior of the tube not to have a cylinder-symmetrical shape, or with recesses for accommodating mechanical drives for optical elements or for allowing the latter to engage into the tube. Also, tubes with axially offset portions may be advantageous for accommodating beam paths that are offset by mirror systems, for example.

In the description which follows, the same reference numerals in the various embodiments of the invention denote similar elements and in particular the same functions and associated effects.

Generally, the invention is applicable to binocular telescopes. Further, in binocular telescopes of the invention other components may be arranged between the tubes, especially in the region of the folding bridges, such as ranging or digital imaging devices, which are supported by their own housing or securing means, for example in the area of the bearing eyes, and which are not illustrated in the drawings for the sake of simplicity but are well known to a person skilled in the art.

An exemplary binocular telescope 1 in which the invention may be implemented, as a whole denoted by reference numeral 1 in FIG. 1, includes two tubes arranged in parallel to one another, each of which accommodates an optical system (2, 3).

Each of optical systems (2, 3) preferably includes at least one objective lens (4, 5), an aperture stop well known in the art and not illustrated in FIG. 1, a prism system (6, 7), and an eyepiece (8, 9).

Objective lenses (4, 5) and eyepieces (8, 9) define respective optical axes (10, 11) and (12, 13).

Objective lens (4, 5) may include a plurality of individual lenses or cemented components.

For the purposes of focusing a generally remote object observed through the binocular telescope, either the eyepiece (8, 9) may be shifted axially, or the entire objective lens (4, 5) may be shifted axially, or a lens group (14, 15), which may be part of the objective lens (4, 5), may be shifted axially. This lens group is usually disposed between objective lens (4, 5) and prism system (6, 7) and may be referred to as a focusing lens.

For focusing, a rotary knob 16 may be arranged on a center line 17, via which focusing lenses (14, 15) can be axially displaced together.

Objective lens (4, 5) is able to generate a real image which is inverted relative to the object being observed, in an image plane associated with the objective lens. For the purposes of image erection, prism system (6, 7) may be configured according to Abbe-König, Schmidt-Pechan, Uppendahl, Porro, or according to another prism system variation. Prism system (6, 7) will erect the inverted image.

In an intermediate image plane, there may be arranged a field stop sharply limiting the visual field.

The eyepiece (8, 9) may be used to display the image of the intermediate image plane at any distance, for example to infinity or at an apparent distance of one meter.

A beam direction may be defined by the order of: object—objective lens—prism system—eyepiece—eye. The optical axis (10, 11) of the objective lens may be laterally offset from the optical axis of eyepiece (8, 9) due to an offset of the optical path caused by the prism system.

Tubes (18, 19) are either connected to each other by at least one two-part bridge, with the center line as a pivoting axis, or are fixedly arranged relative to one another in a common housing.

Figure 2:
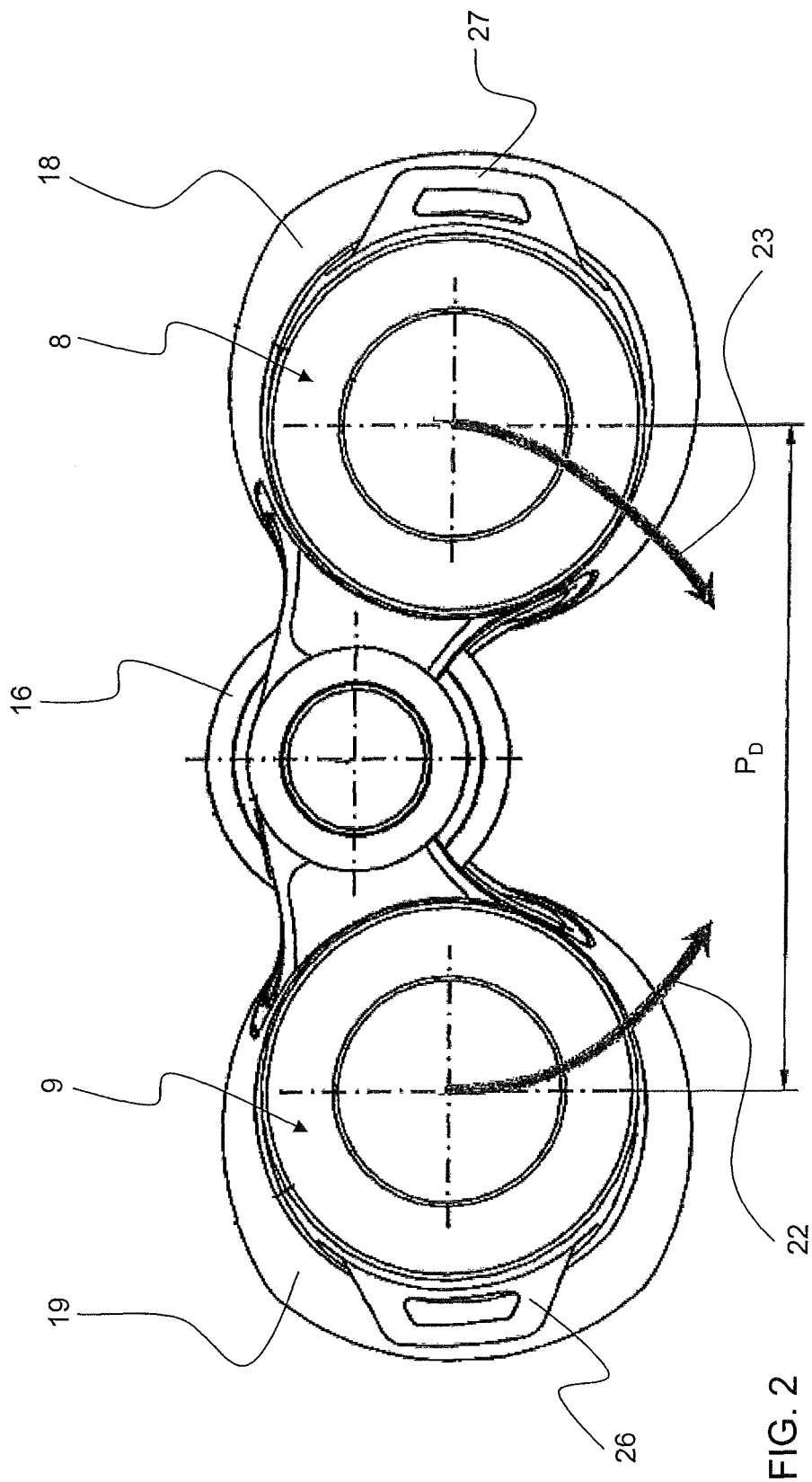
FIG. 2 is a plan view of the eyepiece side of the binocular in its transport position.

If the at least one two-part bridge or folding bridge (20, 21) is provided, a user's interpupillary distance may be accommodated by folding or pivoting bridge (20, 21), which is exemplified in FIG. 2 by arrows 22 and 23.

The aperture stop may be formed either by a frame of an optical component or may be defined by a separate diaphragm. It may be imaged in a plane that is behind the eyepiece in the beam direction, typically with a spacing from 5 to 25 mm thereto, by the rest of the optical unit that follows in the beam direction. This plane may be referred to as an exit pupil plane. A vision defect of the user may be accommodated by a diopter compensation. For this purpose, the axial positions of focusing lenses (14, 15) of the two tubes may be adjustable relative to each other by the user, for example.

Another possibility is to provide for altering the axial positions of eyepieces (8, 9) relative to each other.

To protect the user from lateral incident light and for establishing the optimal distance of the eye to the eyepiece, the eyepieces may be equipped with extendable, screw-out, or folding eyecups (24, 25).

Furthermore, a binocular telescope may include additional optical components, for example for image stabilization, beam input or extraction, or for photographic purposes.

Also, electronic components, control elements, or energy storage necessary or useful for the mentioned purposes may be provided.

The binocular telescope may be equipped with holding means (26, 27), usually at the lateral sides thereof, which can be used to attach a carry strap, for example.

For the correct functioning of binocular telescope 1 or the binocular 1, it is necessary to maintain the highly accurate alignment of the two optical paths as set, and thus of optical axes 10 and 12 relative to optical axes 11 and 13 when folding the binocular.

Figure 3:
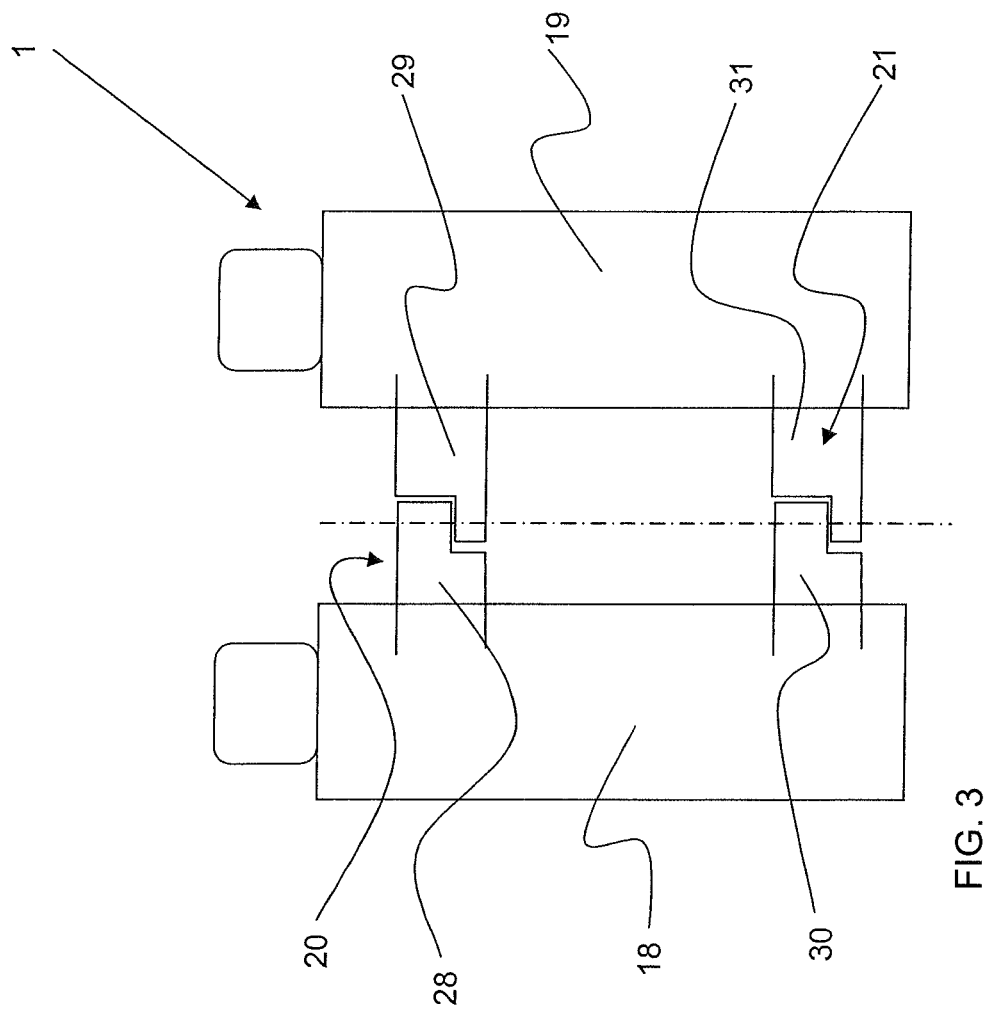
FIG. 3 is a schematic view of a binocular having two folding bridges.

For this purpose it is advantageous when folding bridges (20, 21) with their respective bridge elements (28, 29) and (30, 31) are spaced far apart so as to provide a stable basis for the mechanical axis effective for pivoting or folding, for this see in particular the schematic of FIG. 3.

Figure 4:
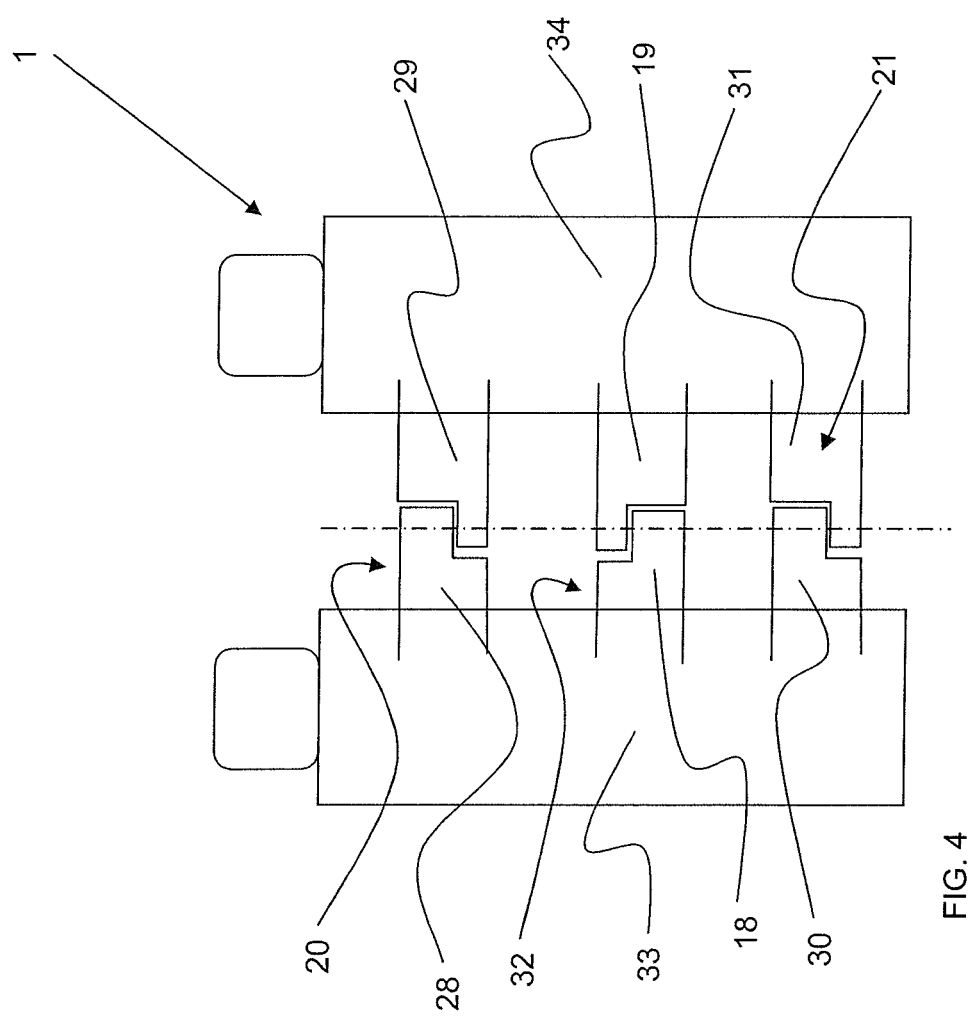
FIG. 4 is a schematic view of a binocular having three folding bridges.

In the schematic of FIG. 4, a binocular telescope 1 can be seen, which has three folding bridges 20, 21 and 32, of which folding bridge 32 has bridge elements 33 and 34.

German patent applications Nos. 10 2012 009 990 and 10 2012 025 614 disclose further advantages in case the binocular telescope 1 has three bridge elements. These German patent applications Nos. 10 2012 009 990 and 10 2012 025 614 are incorporated herein by reference in their entirety into the subject matter of the present invention and in particular into the disclosure of the present specification.

Figure 5:
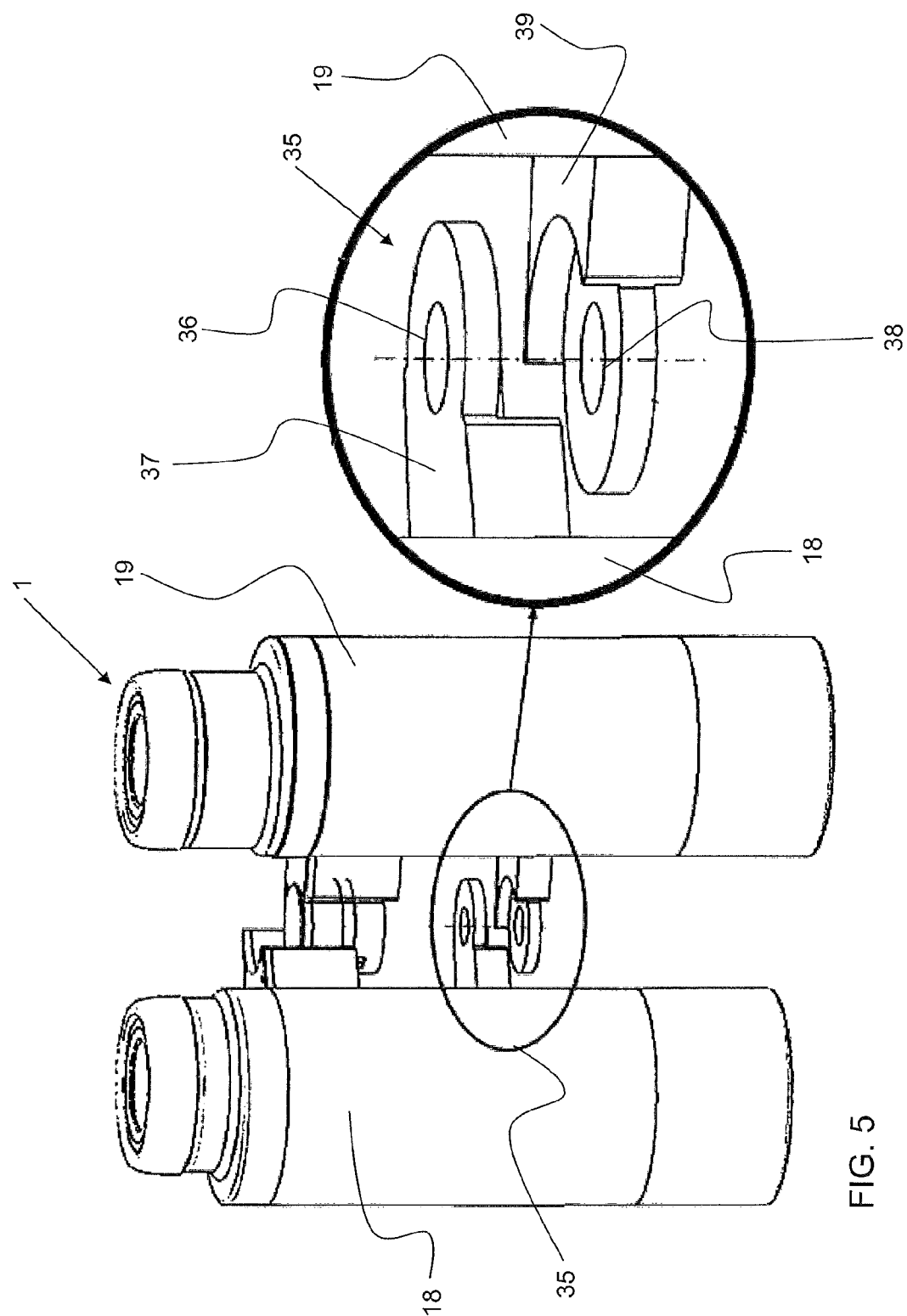
FIG. 5 is a schematic of a binocular having two folding bridges, in a partially disassembled state, with a detailed view of the configuration of a conventional folding bridge.

The exemplary configuration of a conventional folding bridge 35 as illustrated in FIG. 5 includes an upper hinge eye 36 which is formed in a bridge element 37 arranged on tube 18, and a lower hinge eye 38 which is formed in a bridge element 39 arranged on tube 19.

Hinge eyes 36 and 38 are adapted to engage each other in the assembled state of binoculars 1. The two hinge eyes each include a bore which, in the assembled state, are arranged coaxially and held pivotably to each other by a pin or a sleeve not shown in the figures but known in the art, thereby defining a common hinge axis of the bridge elements.

The various embodiments of the invention also use conventional folding bridges, at least partially, which means unless otherwise indicated, which may be configured as folding bridge 35.

A folding bridge according to the invention will now be described below with reference to FIG. 6 for a binocular 1 having three folding bridges, a first folding bridge 40, a second folding bridge 41, and a third folding bridge 42, wherein at least one of these folding bridges is configured according to the invention.

Figure 6:
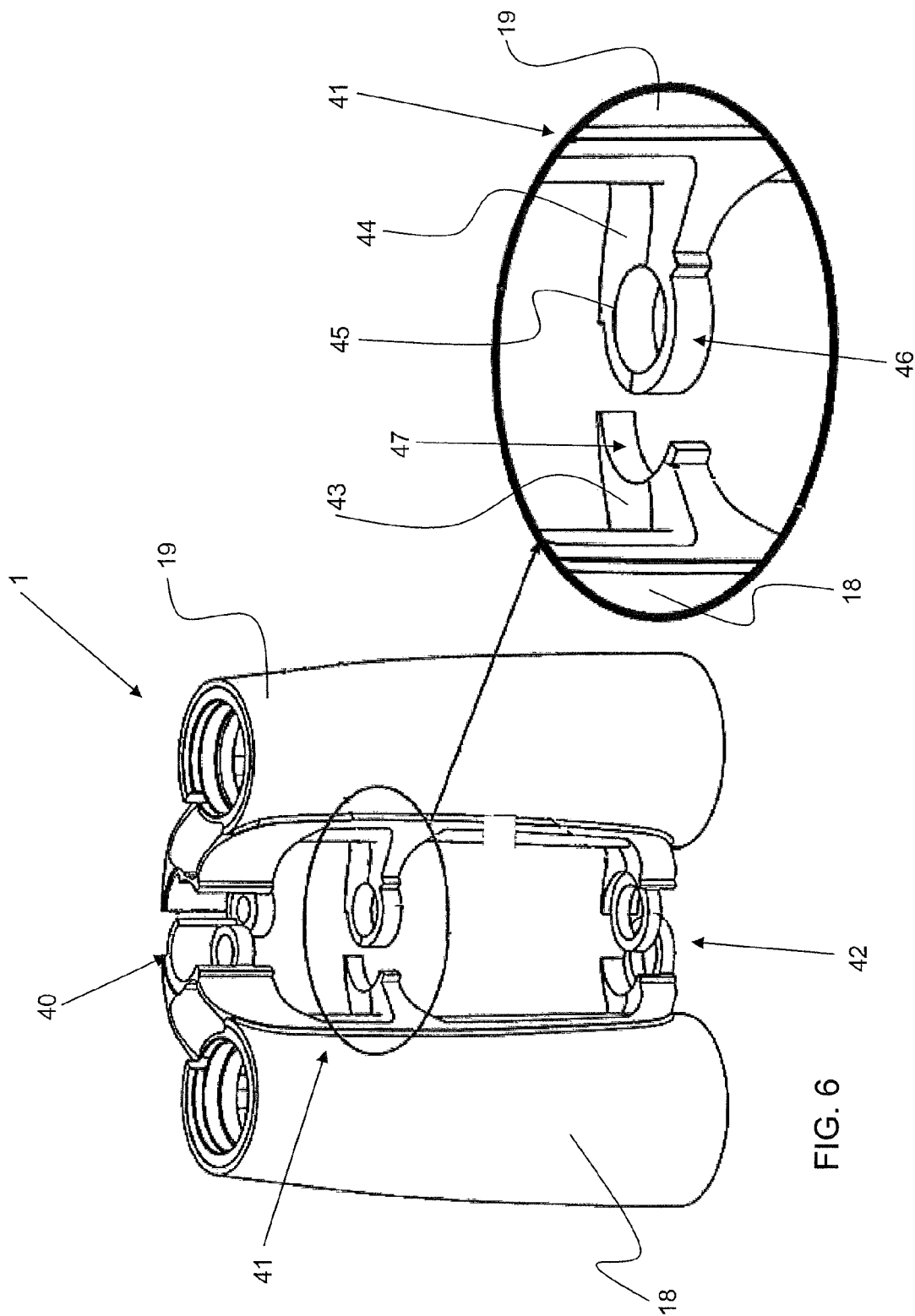
FIG. 6 is a schematic view of a binocular having three folding bridges, in a partially disassembled state, with a detailed view of the configuration of a folding bridge according to the invention.

In the first preferred embodiment illustrated in FIG. 6, this at least one folding bridge is the second folding bridge 41, which is arranged between the first and third folding bridges (40, 42) as seen in an axial direction, which means in the direction of the center line of binoculars 1.

In another, second preferred embodiment, the second folding bridge 41 may be configured in conventional manner, and the first folding bridge 40 and third folding bridge 42 may be configured according to the invention, that is as described below for folding bridge 41 of the first preferred embodiment, so that the at least one folding bridge according to the invention includes first and third folding bridges (40, 42), with the first folding bridge 40 arranged axially in front of the second folding bridge 41, and the third folding bridge 42 axially behind the second folding bridge 41.

Reference is now made to the detailed view in FIG. 6. The at least one folding bridge according to the invention, which is folding bridge 41 in this embodiment, includes a first bridge element 43 arranged on tube 18, and a second bridge element 44 arranged on tube 19.

According to the invention, a hinge eye with close fit or fit without clearance is dispensed with at one half of the housing, at least in a folding or pivoting range of folding bridge 41.

Bridge element 43 has an open configuration and does not act as a hinge together with bridge element 44, at least for part of the folding or pivoting range.

Bridge element 44 on tube 19 may have a completely closed shape.

Bridge element 43 on tube 18 has an open configuration to encompass hinge eye 45 of bridge element 44 in the assembled state.

In the first preferred embodiment, the dimensions of bridge elements (43, 44) are selected such that a gap results between the outer perimeter 46 of hinge eye 45 and the open perimeter 47 of bridge element 43, at least for part of the pivoting movement. This may be implemented, for example, through the respective diameters of perimeters 46 and 47 of bridge elements 43 and 44. Without limiting the invention, the perimeter 46 of hinge eye 45 may have a diameter of 20 mm, and the open perimeter 47 of bridge element 43 may have a diameter of 22 mm.

The result will be a gap of 1 mm between bridge elements 43 and 44 in the assembled state of binoculars 1, which defines a constant spacing of the bridge elements for the fit between bridge elements (43, 44), especially during a pivoting movement of the bridge elements relative to one another.

This spacing between bridge elements (43, 44), which is also referred to as a clearance of the fit between bridge elements (43, 44), may be in a range from 0.001 mm to 1.5 mm, preferably in a range from 0.01 mm to 1.3 mm, and most preferably in a range from 0.1 mm to 1.1 mm, and can prevent the bridge elements (43, 44) from contacting mechanically in the absence of an external force, at least in sections of the folding or pivoting range of bridge elements (43, 44).

Tubes (18, 19) and/or bridge elements 28 to 31, 33, 34, 37, 43, 44 of folding bridges (40, 41, 42) may be made of a metallic material, for example an aluminum alloy.

Alternatively, tubes (18, 19) and/or bridge elements 28 to 31, 33, 34, 37, 43, 44 of folding bridges (40, 41, 42) or portions thereof, for example in the region of hinge eyes (36, 38, 45) and of open perimeter (47, 47', 47") of bridge element 43 may be made of a non-metallic material, in particular a plastic material or a composite material, especially a glass or carbon fiber reinforced plastic material.

By taking into account the material and in particular the elastic modulus thereof and the dimensions of each component, the fit between bridge elements (43, 44) of the at least one folding bridge may be defined such that a mechanical contact between bridge elements (43, 44) of the at least one folding bridge does not occur unless a predefined external force is exceeded, which acts laterally, or in one of the embodiments described below also axially, on the long-range optical device 1.

As a result of the clearance, when folding the binocular telescope 1, the two bridge elements of the corresponding folding bridges will not interfere with each other nor will they have any impact on the folding operation or pivoting movement. Thus, in the first preferred embodiment, when there is no external force, the folding axis of binocular telescope 1 will only be defined by the two other, first and second folding bridges (20, 21), and the at least one folding bridge may be operatively separated therefrom.

Below, a further, second preferred embodiment of the invention will be described with reference to FIG. 7.

In this embodiment of the at least one folding bridge, the bridge elements (43, 44) thereof have an interengaging structure that is radially varying in an axial direction. The outer perimeter 46' of hinge eye 45 and the open perimeter 47' do not have a substantially cylindrical shape as in the first embodiment, but merely have a columnar shape in each case.

As a result thereof, the clearance of the fit between bridge elements (43, 44) changes upon folding or pivoting, and, during part of the folding or pivoting movement, a portion of the outer perimeter 46' of hinge eye 45 may engage the open perimeter 47' of bridge element 43, thereby causing defined friction forces which provide a tactile feedback to the user on the one hand, and on the other allow to secure the binoculars in one or more positions against further rotation, for example in a transport position of the binocular 1.

Figure 7:
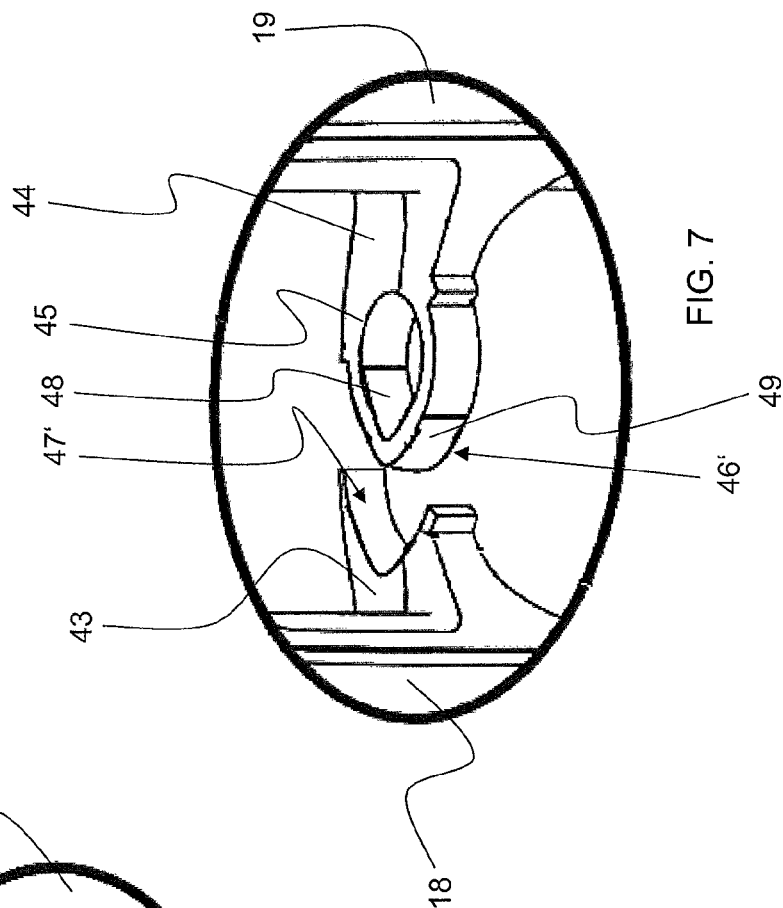
FIG. 7 is a detailed view of the bridge elements of another embodiment of the folding bridge according to the invention; and, FIG. 8 is a detailed view of the bridge elements of yet another embodiment of the folding bridge according to the invention.

When at least a portion of hinge eye 45, which is shown in FIG. 7 as a portion 48, is made of an elastic material, for example a plastic or composite material, this permits to provide defined frictional forces and a very well defined tactile feedback as well as a highly safe transport position.

As an example, a spacer 49 is shown in this embodiment but can be used for all embodiments of the invention. The spacer 49 is arranged on the outer perimeter 46' of hinge eye 45.

This spacer 49 includes a partially reversibly deformable material and has a predefined radial thickness. The partially reversibly deformable material includes an elastomer, in particular a synthetic rubber or a porous structure or entirely consists of one of these materials.

In the assembled state of binoculars 1, in all embodiments of the invention spacer 49 may fill the clearance of the fit of the at least one folding bridge, completely or only partially, whereby predefined friction forces and shock-absorbing restoring forces may be produced.

Figure 8:
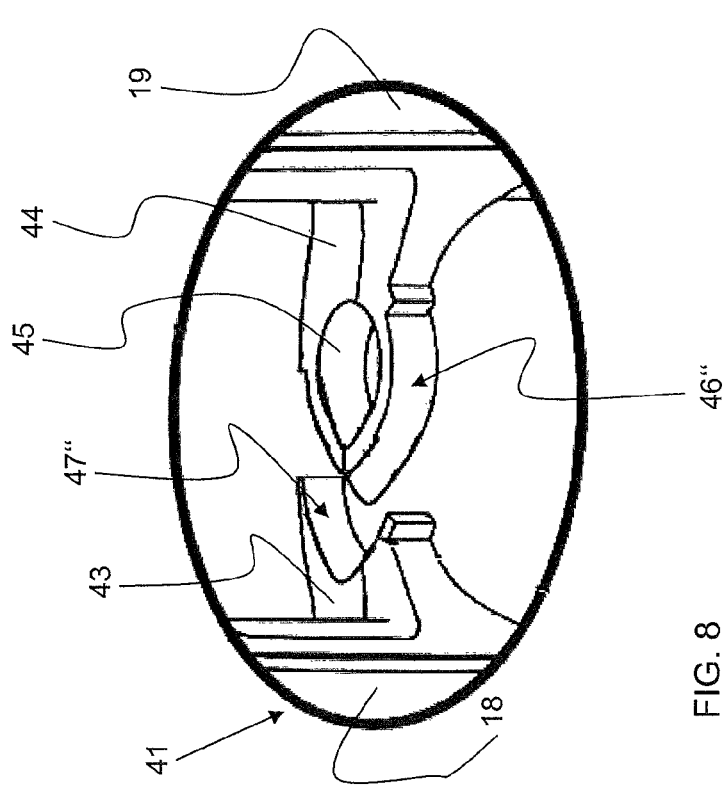

Referring now to FIG. 8 which shows yet another embodiment of the invention.

The at least one folding bridge 41 includes bridge elements (43, 44) which have an interengaging structure that is radially varying in an axial direction.

The outer perimeter 46" of hinge eye 45 has a radial bulge, for example a strongly barrel-shaped bulge, which in the assembled state of binoculars 1 extends into a corresponding radial indentation of the open perimeter of bridge element 43. Instead of the barrel-shaped bulge of the outer perimeter 46", the bulge may have a triangular or rectangular shape or even a free shape, thereby defining a specific cooperation with the associated indentation of the open perimeter 47" in case of an axial displacement of tubes (18, 19) relative to each other, thereby counteracting this displacement with defined restoring forces.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Binocular telescope or a binocular
2 Optical System
3 Optical System
4 Objective lens
5 Objective lens
6 Prism system
7 Prism system
8 Eyepiece
9 Eyepiece
10 Optical axis of objective lens 4
11 Optical axis of objective lens 5
12 Optical axis of eyepiece 8
13 Optical axis of eyepiece 9
14 Lens group constituting a focusing lens which is part of objective lens 4
15 Lens group constituting a focusing lens which is part of objective lens 5
16 Rotary knob
17 Center line of binoculars
18 Tube
19 Tube
20 Bridge or folding bridge
21 Bridge or folding bridge
22 Arrow indicating pivoting of the folding bridge
23 Arrow indicating pivoting of the folding bridge
24 Eyecup
25 Eyecup
26 Holding means
27 Holding means
28 Bridge element of bridge 20
29 Bridge element of bridge 20
30 Bridge element of bridge 21
31 Bridge element of bridge 21
32 Bridge or folding bridge
33 Bridge element of bridge 32
34 Bridge element of bridge 32
35 Conventional folding bridge
36 Upper hinge eye on bridge element 37
37 Bridge element of conventional folding bridge 35
38 Lower hinge eye on bridge element 39
39 Bridge element of conventional folding bridge 35
40 First folding bridge of first embodiment of the invention
41 Second folding bridge of first embodiment of the invention
42 Third folding bridge of first embodiment of the invention
43 Bridge element
44 Bridge element
45 Hinge eye of bridge element 44
46 Outer perimeter of hinge eye 45
46' Outer perimeter of hinge eye 45
46" Outer perimeter of hinge eye 45
47 Open perimeter of bridge element 43
47' Open perimeter of bridge element 43
47" Open perimeter of bridge element 43
48 Portion at least in the region of hinge eye 45
49 Spacer

What is claimed is:

1. A long range optical apparatus comprising:
   a first tube and a second tube each configured to receive long range optical elements;
   a first folding bridge pivotally arranged between said first tube and said second tube;
   a second folding bridge pivotally arranged between said first tube and said second tube;
   each one of said first and second folding bridges having first and second bridge elements assigned thereto and said bridge elements being configured to be pivotal with respect to each other;
   the first and second bridge elements of each one of said folding bridges conjointly defining a fold or pivot region; and,
   at least one of said first and said second folding bridges having a fitting configured to prevent mutual mechanical contact of the first and second bridge elements thereof in the fold or pivot region corresponding thereto,
   wherein a gap is defined between the bridge elements of said folding bridge having said fitting, and
   wherein the folding bridges with their respective bridge elements are spaced far apart.

2. The long range optical apparatus of claim 1, wherein said gap defines a constant spacing of said first and second bridge elements of said folding bridge having said fitting relative to each other including during pivoting thereof.

3. The long range optical apparatus of claim 1, wherein said gap lies in a range of 0.001 mm to 1.5 mm.

4. The long range optical apparatus of claim 1, wherein said gap lies in a range of 0.01 mm to 1.3 mm.

5. The long range optical apparatus of claim 1, wherein said gap lies in a range of 0.1 mm to 1.1 mm.

6. The long range optical apparatus of claim 1, wherein:
   the long range optical apparatus has a first weight;
   said corresponding ones of said bridge elements of said folding bridge having said fitting define said gap therebetween without a further mechanical load other than said first weight; and,
   said gap is configured to prevent essentially any friction forces between said corresponding bridge elements during a folding or pivoting thereof.

7. The long range optical apparatus of claim 1, wherein said fitting, between said first and second bridge elements of the corresponding one of said folding bridges, is defined so as to cause a mutual mechanical contact between said first and second bridge elements to be generated only when a defined external lateral or axial force acting on the long range optical apparatus is exceeded.

8. A long range optical apparatus comprising:
   a first tube and a second tube each configured to receive long range optical elements;
   a first folding bridge pivotally arranged between said first tube and said second tube;
   a second folding bridge pivotally arranged between said first tube and said second tube;
   each one of said first and second folding bridges having first and second bridge elements assigned thereto and said bridge elements being configured to be pivotal with respect to each other;
   the first and second bridge elements of each one of said folding bridges conjointly defining a fold or pivot region;
   at least one of said first and said second folding bridges having a fitting configured to prevent mutual mechanical contact of the first and second bridge elements thereof in the fold or pivot region corresponding thereto; and,
a deformable spacer configured to be at least partially reversably deformable and arranged between said corresponding first and second bridge elements of said one of said folding bridges.

9. A long range optical apparatus comprising:
a first tube and a second tube each configured to receive long range optical elements;
a first folding bridge pivotally arranged between said first tube and said second tube;
a second folding bridge pivotally arranged between said first tube and said second tube;
each one of said first and second folding bridges having first and second bridge elements assigned thereto and said bridge elements being configured to be pivotal with respect to each other;
the first and second bridge elements of each one of said folding bridges conjointly defining a fold or pivot region;
at least one of said first and said second folding bridges having a fitting configured to prevent mutual mechanical contact of the first and second bridge elements thereof in the fold or pivot region corresponding thereto;
said first and said second folding bridge each defining a pivot path and a plurality of pivot positions; and,
corresponding ones of said first and second bridge elements of said one of said folding bridges having radially changing dimensions along the corresponding pivot path and defining a play in dependence upon the pivot position assumed by said bridge elements of said one folding bridge.

10. A long range optical apparatus comprising:
a first tube and a second tube each configured to receive long range optical elements;
a first folding bridge pivotally arranged between said first tube and said second tube;
a second folding bridge pivotally arranged between said first tube and said second tube;
each one of said first and second folding bridges having first and second bridge elements assigned thereto and said bridge elements being configured to be pivotal with respect to each other;
the first and second bridge elements of each one of said folding bridges conjointly defining a fold or pivot region;
at least one of said first and second folding bridges having a fitting configured to prevent mutual mechanical contact of the first and second bridge elements thereof in the fold or pivot region corresponding thereto;
the long range optical apparatus defining an axial direction; and,
said bridge elements of said at least one of said first and said second folding bridges having an interlinking structure which radially changes in said axial direction.

11. The long range optical apparatus of claim 1, wherein said first and second tubes and/or said bridge elements of said folding bridge are made of a non-metallic material.

12. The long range optical apparatus of claim 11, wherein said non-metallic material includes plastic or a composite material.

13. The long range optical apparatus of claim 1, wherein at least one of said first and second tubes and/or said bridge elements are made of one of glass fiber reinforced plastic or carbon fiber reinforced plastic.

14. The long range optical apparatus of claim 1, wherein the long range optical apparatus is a binocular.

15. A long range optical apparatus comprising:
a first tube and a second tube each configured to receive long range optical elements;
a first folding bridge pivotally arranged between said first tube and said second tube;
a second folding bridge pivotally arranged between said first tube and said second tube;
a third folding bridge pivotally arranged between said first tube and said second tube;
each one of said first, second and third folding bridges having first and second bridge elements assigned thereto and said bridge elements being configured to be pivotal with respect to each other;
the first and second bridge elements of each one of said folding bridges conjointly defining a fold or pivot region; and,
at least one of said first, said second and said third folding bridges having a fitting configured to prevent mutual mechanical contact of the first and second bridge elements thereof in the fold or pivot region corresponding thereto,
wherein a gap is defined between the bridge elements of said folding bridge having said fitting, and
wherein the folding bridges with their respective bridge elements are spaced far apart.

16. The long range optical apparatus of claim 15, wherein said second bridge has said fitting and is arranged axially between said first folding bridge and said third folding bridge.

17. The long range optical apparatus of claim 15, wherein:
each of said first and said third folding bridges includes said fitting;
said first folding bridge is arranged axially ahead of said second folding bridge; and,
said third folding bridge is arranged axially behind said second folding bridge so as to place said second folding bridge between said first and third folding bridges.

18. A long range optical apparatus comprising:
a first tube and a second tube each configured to receive long range optical elements;
a first folding bridge pivotally arranged between said first tube and said second tube;
a second folding bridge pivotally arranged between said first tube and said second tube;
a third folding bridge pivotally arranged between said first tube and said second tube,
each one of said folding bridges having first and second bridge elements assigned thereto and said bridge elements being configured to be pivotal with respect to each other;
the first and second bridge elements of each one of said folding bridges conjointly defining a fold or pivot region; and,
at least one of said folding bridges having a fitting configured to prevent mutual mechanical contact of the first and second bridge elements thereof in the fold or pivot region corresponding thereto, wherein a gap is defined between the bridge elements of said third folding bridge having said fitting.

19. A long range optical apparatus comprising:
a first tube and a second tube each configured to receive long range optical elements;

wherein, for focusing, a rotary knob may be arranged on a center line, via which focusing lenses can be axially displaced together, a first folding bridge pivotally arranged between said first tube and said second tube;

a second folding bridge pivotally arranged between said first tube and said second tube;

each one of said first and second folding bridges having first and second bridge elements assigned thereto and said bridge elements being configured to be pivotal with respect to each other;

the first and second bridge elements of each one of said folding bridges conjointly defining a fold or pivot region;

at least one of said first and said second folding bridges having a fitting configured to prevent mutual mechanical contact engagement of the first and second bridge elements thereof in the fold or pivot region corresponding thereto; and, said bridge elements conjointly defining a clear space therebetween thereby preventing said mutual mechanical contact engagement of said first and second bridge elements.

20. The long range optical apparatus of claim 19, wherein the clear space prevents the first and second bridge elements from being in direct and indirect mutual mechanical contact.

* * * * *